United States Patent [19]

Jinno

[11] 4,359,381
[45] Nov. 16, 1982

[54] ASPHALT RECYCLING APPARATUS

[76] Inventor: Michio Jinno, 6-3 Yasuda-dori, Showa-ku, Nagoya-shi, Aichi-ken, Japan

[21] Appl. No.: 262,433

[22] Filed: May 11, 1981

[51] Int. Cl.³ .................... B03B 1/02; C10C 3/12
[52] U.S. Cl. ............................ 209/3; 209/11;
209/238; 106/276; 106/277; 106/278; 106/281 R; 126/343.5 A; 196/155; 208/39; 366/25; 425/445
[58] Field of Search ............... 196/14.52, 155; 126/343.5 A; 208/22, 39; 209/2, 3, 11, 238; 106/281 R; 264/37, DIG. 69; 425/445, 217; 366/25

[56] References Cited

U.S. PATENT DOCUMENTS

| | | | |
|---|---|---|---|
| 3,348,739 | 10/1967 | Brock | 126/343.5 A |
| 4,100,059 | 7/1978 | Jinno | 209/3 |
| 4,197,014 | 4/1980 | Jinno | 366/24 |
| 4,256,414 | 3/1981 | Milligan | 126/343.5 A |
| 4,279,660 | 7/1981 | Kamo et al. | 106/281 R |

Primary Examiner—Bradley Garris
Attorney, Agent, or Firm—Kenway & Jenney

[57] ABSTRACT

An apparatus for regenerating used mixtures for road pavement including an asphalt concrete mixture and a cement concrete mixture is provided with a first vibration sieve, conveyer, passage, roof, transferring means, guide means such as a V-shape plate and a screw conveyer, spray means such as water supply pipes, discharging means such as a hoist device, and a second vibration sieve. The asphalt concrete mixture together with others are sorted by the first vibration sieve, transferred in a given direction by the transferring means such as a container, heated by the hot water from the spray means, subdivided and sorted by the second vibration sieve.

11 Claims, 3 Drawing Figures

ASPHALT RECYCLING APPARATUS

The present invention relates to an apparatus for regenerating road paving materials.

For a long time, I have studied asphalt recycling systems in which an asphalt mixture is regenerated by subdividing the asphalt mixtures in hot water. See, for example, U.S. Pat. Nos. 4,100,059 and 4,197,014 issued to me. In practice, the asphalt mixtures removed during road repairs are often mixed with cement concrete mixture and other materials. In such cases, it is difficult to selectively separate the asphalt from the other waste materials for the purpose of asphalt recycling.

The object of the present invention is to provide an apparatus for separating and regenerating asphalt from admixtures with cement concrete mixtures and/or other materials.

BRIEF DESCRIPTION OF THE DRAWINGS

The present invention will be explained by the following description of a preferred embodiment taken in conjunction with the accompanying drawings in which.

DESCRIPTION OF THE PREFERRED EMBODIMENT

Figure 1:
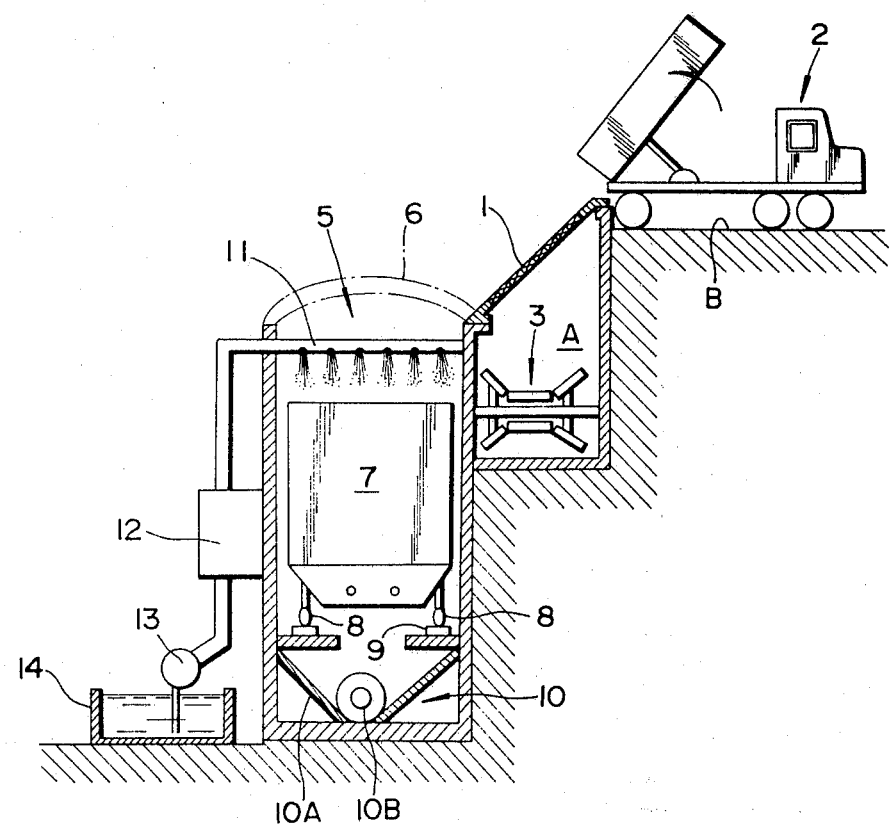
FIG. 1 is a vertical section showing an apparatus for regenerating an asphalt mixture according to an embodiment of the present invention.
Figure 2:
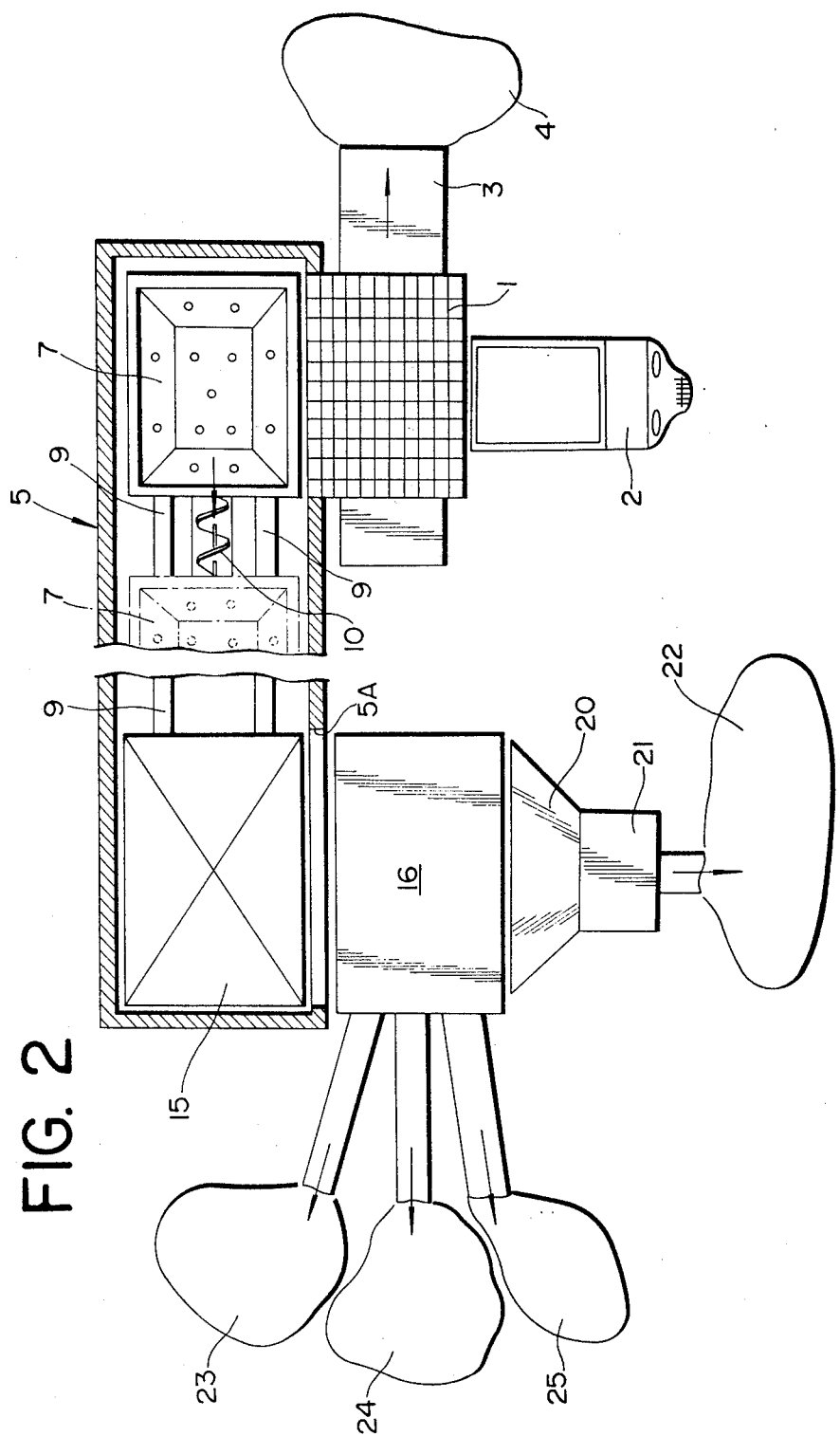
FIG. 2 is a schematic plan view, partly shown in section, of the apparatus as shown in FIG. 1.

Referring to FIGS. 1 and 2, a vibration sieve 1 is arranged over a space A at an inclination. The upper end of the vibration sieve 1 is near the ground surface B where a dump truck 2 may approach. The dump truck 2 transports used road pavement materials removed in the course of repairs. The asphalt is often mixed with a cement concrete mixture and other materials.

The asphalt and other road pavement materials move down along the vibration sieve 1 by gravity and/or the vibration of the vibrating sieve 1.

A conveyer 3 is placed under the vibration sieve 1 in the space A. One end of the conveyer 3 delivers to a stockpile 4.

Particles, aggregates or the like of less than 50 mm diameter pass through the vibration sieve 1 and fall down onto the conveyer 3. Most of these particles of such small diameter are materials other than asphalt or cement. These particles less than 50 mm in diameter are transferred to the stockpile 4 for the future use thereof as a road base material.

A spray tunnel or passage 5 for transferring the screened mixtures is located near the lower end of the vibration sieve 1. In the illustrated embodiment, the passage 5 may be formed of a cement concrete wall, fire-brick wall, heat-proof material wall or iron wall in a channel shape. A roof 6 covers the top opening of the passage 5 to prevent heat from escaping.

Means for transporting the mixtures along passage 5 is provided including, for example, a container 7 mounted on a plurality of wheels 8 which run on a pair of rails 9. The container 7 runs on the rails 9 for transferring the mixtures from one end of the passage 5 to the other.

A number of small holes are formed in the lower portion of the container 7 to permit water contained therein to flow out through the holes.

Guide means 10 is arranged on the bottom of the passage 5 along the full length thereof. The guide means 10 includes a guide plate 10A in a V-shape and a screw conveyer 10B placed in the bottom of the guide plate 10A. The screw conveyer 10B is used to transfer the water and waste such as mud which flow down along the guide plate 10A from the container 7. One end of the screw conveyer 10B may be connected to a bucket conveyer (not shown) provided at one end of the passage 5 so that the waste can be transferred into a dump truck.

Spray means such as water supply pipe means 11 having a number of apertures is arranged in the upper portion of the passage 5 and preferably near the top of the container 7. The pipe means 11 is connected to a heater 12, a pump 13, and a tank 14 in series. The apertures in the pipe means 11 are located only in the passage and face downwardly. The water in the tank 14 is pumped up by the pump 13 heated by the heater 12 and sprayed through the apertures of the pipe means 11 onto the mixture contained in the container 7.

Although not shown, the pipe means also can be provided at the sides of the passage 5 to spray the hot water onto the sides of the container 7.

A plurality of pipe means 11 are placed at predetermined intervals along the full length of the passage 5. As the container 7 moves on the rails 9 in a given direction, the hot water falls down onto the mixtures in the container 7.

Preferably, a plurality of burners (not shown) are arranged at both sides and at the bottom of the passage 5 at predetermined intervals to heat both sides and the bottom of the container 7 and the mixture of water and paving material contained therein. By such means, the asphalt mixture can be softened in a very short time. It should be noted that the ambient temperature is maintained high due to the hot air from the burners.

Figure 3:
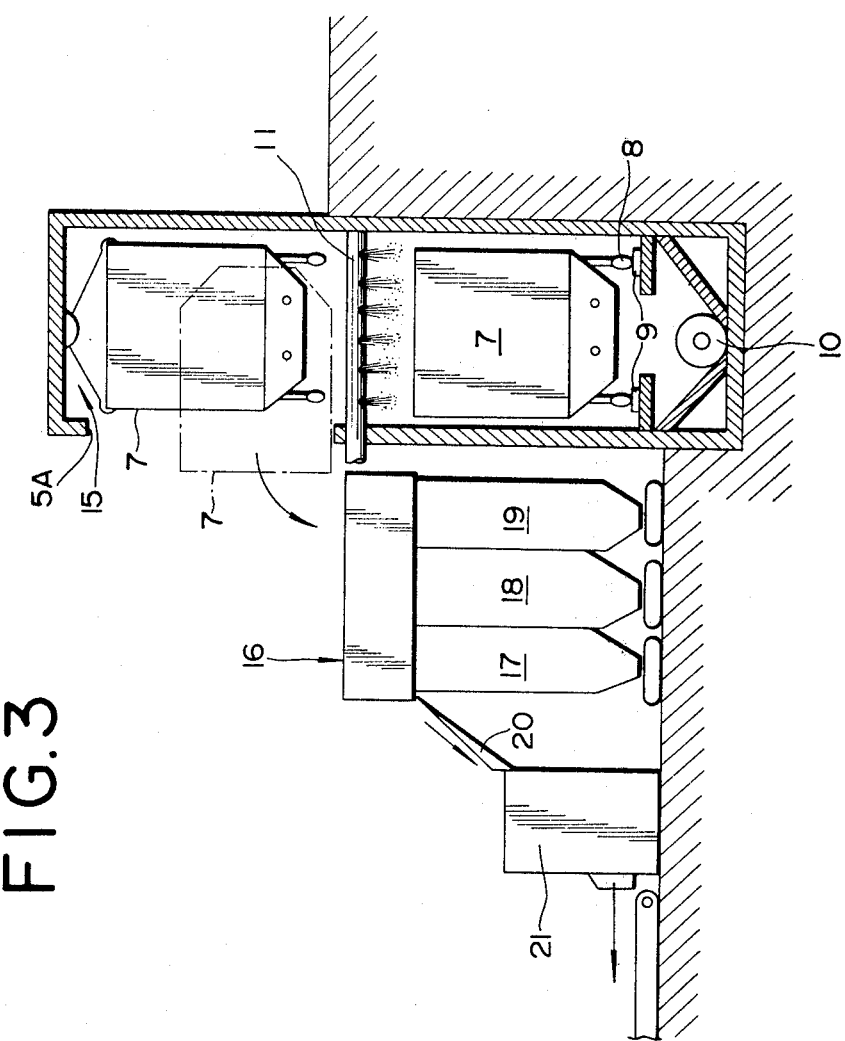
FIG. 3 is a schematic elevation, partly in section, of the apparatus as shown in FIG. 1.

As shown in FIGS. 2 and 3, means is provided for discharging the mixtures through the outlet 5A located at one end of the passage 5. For instance, a hoist device 15 is provided at the discharge end of the passage 5. The container 7 is lifted up and turned 90 degrees by the hoist device 15 so that the mixture in the container 7 may be discharged through the outlet 5A onto a vibration sieve 16.

The vibrating sieve 16 is equipped with three hoppers 17, 18, 19 for receiving three groups of materials of different predetermined sizes. The over-size particles or pieces fall into a chute 20.

After the asphalt mixture arrives at the discharge end of the passage 5, it is sufficiently softened by the hot water sprayed from the pipe means 11 and the hot air from the burners within the passage 5. Therefore, when the softened asphalt mixture is vibrated on the vibrating sieve 16, it is subdivided and sorted into three sizes of asphalt aggregates. The hoppers 17-19 receive the respective sizes of regenerated asphalt mixture.

Most of over-size pieces are the concrete cement mixture. Such over-size pieces are transferred through the chute 20 to a crusher 21 and, thereafter, to a stockpile 22.

The regenerated asphalt mixtures in the hoppers 17-19 are transferred to and stocked in the respective stockpiles 23-25.

In operation, dump trucks 2 receive the asphalt waste, cement concrete waste, crushed stones used as a road base material, and sand and soil used as a road bottom material as scooped out for road repairs. At a recycling location, the scrap road pavement materials are transferred from the trucks 2 to the vibration sieve 1. Then, those used waste or materials can be automatically regenerated by the apparatus of the present invention.

Thus, the small pieces are first separated at the vibration sieve 1, fall down onto the conveyer 3 and are transferred to the stockpile 4. The relatively large sizes of pieces are transferred into the container 7 from the lower end of the vibration sieve 1. Those larger pieces fall down into the container 7 through the upper opening at the entrance end of the passage 5.

While the container 7 with the mixture moves from the entrance end of the passage 5 to the discharge end, the asphalt mixture is softened by the hot water sprayed from the pipe means 11 and the hot air from the burners if any.

At the discharge end of the passage 5, the container 7 is lifted up and turned 90° by the hoist device 15. As a result, the asphalt and other material in the container 7 are discharged from the container 7 onto the vibration sieve 16. Among the heated mixtures, the asphalt mixture is already softened. Therefore, the softened asphalt mixture is of a nature wherein the aggregate particles have a weak adherence to each other. Thus, when the asphalt mixture is vibrated by the vibration sieve 16, the asphalt mixture is subdivided, for recycling, into many aggregate particles each having an asphalt film on its surface. The details thereof are described in U.S. Pat. Nos. 4,100,059 and 4,197,014 which are incorporated into the description of the present invention.

Those recycled asphalt aggregates and others are sorted by the vibration sieve 16 and fed into the respective hoppers 17–19 in accordance with their sizes.

Since the cement concrete components in the mixture are not softened by the hot water, their sizes are almost all large and no subdivision occurs even on the vibration sieve 16. Thus, most of the over-size pieces are the cement concrete components. Such large pieces are crushed by the crusher 21 at a later stage.

Although one preferred embodiment of the present invention has been shown and described, the present invention is not limited thereto and can be practiced in other forms without departing from the scope of the claims.

For instance, as a transferring means, a conveyer can be used in place of the container 7 equipped with the wheels 8. The passage 5 can be made in an endless form. A plurality of containers can be employed.

Also, several parts of a regenerating apparatus can be formed as a unit so that each unit can be easily transported. In such a case, it is preferred that each unit be equipped with wheels for the transportation purpose.

The softened asphalt mixture can be penetrated by a rod-like or fork-like member to accellerate subdividing of the softened asphalt mixture during transfer through the passage 5.

I claim:

1. An apparatus for regenerating scrap pavement materials containing asphalt components in admixture with cement components, comprising:
    a stationary tunnel and hot water spray means mounted within said tunnel;
    conveying means movable linearly through said tunnel for receiving the scrap pavement material and for conveying the material through said tunnel wherein the material is heated by contact with the hot water spray and the asphalt components are thereby softened;
    collecting means, disposed along the length of said tunnel and beneath said conveying means for collecting water and matter washed from said scrap material by said spray means; and
    separating means for receipt of the scrap pavement material from said conveying means and for separating the material.

2. The apparatus of claim 1 wherein said conveying means includes a container having an upper open end for receipt of the scrap material.

3. The apparatus of claim 2 wherein said container is equipped with a plurality of wheels which ride on a pair of rails provided in said tunnel.

4. The apparatus of claim 2 further comprising hoist means for lifting said container, turning said container and emptying said container onto said separating means.

5. The apparatus of claim 2 wherein said container has a plurality of bottom apertures for drainage of the hot water and matter washed from the scrap material.

6. The apparatus of claim 1 wherein said collecting means comprises a V-shaped trough containing a screw conveyor for removal of the water and matter washed from the scrap material.

7. The apparatus of claim 1 wherein said hot water spray means includes a water supply pipe formed with a number of small holes facing the conveying means.

8. The apparatus of claim 7 wherein said pipe is connected to a heater, pump and tank in series.

9. The apparatus of claim 1 further comprising a plurality of burners for further heating the scrap material as it passes through said tunnel.

10. The apparatus of claim 1 wherein the top of the tunnel is covered.

11. The apparatus of claim 1 further comprising a first vibration sieve mounted at an inclined angle with respect to the horizontal for receiving the scrap pavement materials at its upper end and for screening out small particles; and
    wherein said conveying means receives the screened scrap pavement material from the lower end of said first vibration sieve; and
    wherein said separating means is a second vibration sieve for receipt of the scrap pavement material from said conveying means and for separating the material into a plurality of different size fractions.

* * * * *